United States Patent
Radu et al.

(10) Patent No.: US 10,455,018 B2
(45) Date of Patent: Oct. 22, 2019

(54) DISTRIBUTED PROCESSING OF SHARED CONTENT

(71) Applicant: Microsoft Technology Licensing, LLC, Redmond, WA (US)

(72) Inventors: Remus Gabriel Radu, Port Moody (CA); Devin Misner, Coquitlam (CA); Jackie Yu Hao Li, Richmond (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 247 days.

(21) Appl. No.: 14/692,571

(22) Filed: Apr. 21, 2015

(65) Prior Publication Data

US 2016/0316014 A1    Oct. 27, 2016

(51) Int. Cl.
*G06F 15/16* (2006.01)
*H04L 29/08* (2006.01)
(Continued)

(52) U.S. Cl.
CPC .......... *H04L 67/1097* (2013.01); *G06F 16/13* (2019.01); *G06F 16/185* (2019.01);
(Continued)

(58) Field of Classification Search
CPC . H04L 67/1097; H04L 51/32; H04L 67/1008; G06F 17/30091; G06F 17/30221; G06F 17/30327; G06Q 50/01
(Continued)

(56) References Cited

U.S. PATENT DOCUMENTS 7,958,193 B2    6/2011    Augustine et al.
8,260,725 B2    9/2012    Crawford
(Continued)

FOREIGN PATENT DOCUMENTS

EP    2385680 A1    11/2011
EP    2738732 A1    6/2014

OTHER PUBLICATIONS

International Search Report & Written Opinion dated Jun. 8, 2016 in International Patent Application No. PCT/US2016/025953, 11 Pages.
(Continued)

*Primary Examiner* — Umar Cheema
*Assistant Examiner* — Hannah S Wang
(74) *Attorney, Agent, or Firm* — Alleman Hall Creasman & Tuttle LLP

(57) ABSTRACT

The present disclosure relates to technology broadcasting shared information in a network. When a user broadcasting the information is distributing to a limited number of users, the system will selectively distribute the information to the limited number of users using a direct iterative or parallelized mechanism. When the user broadcasting the information is distributing to a large number of users, the system will selectively distribute the information using a distributed and parallel processing mechanism. The distributed and parallel processing mechanism includes multiple processing nodes, formed of multiple processing sub-nodes, with varying depths or hierarchal levels which allow for the propagation of the information in an efficient manner without exhausting computing resources.

4 Claims, 10 Drawing Sheets

(51) Int. Cl.
*G06Q 50/00* (2012.01)
*H04L 12/58* (2006.01)
*G06F 16/22* (2019.01)
*G06F 16/13* (2019.01)
*G06F 16/185* (2019.01)

(52) U.S. Cl.
CPC ......... *G06F 16/2246* (2019.01); *G06Q 50/01* (2013.01); *H04L 51/32* (2013.01); *H04L 67/1008* (2013.01)

(58) Field of Classification Search
USPC ........................................................ 709/206
See application file for complete search history.

(56) References Cited

U.S. PATENT DOCUMENTS

| | | | |
|---|---|---|---|
| 8,285,258 | B2 | 10/2012 | Schultz et al. |
| 8,560,678 | B2 | 10/2013 | Tseng |
| 8,676,626 | B1 | 3/2014 | Vance |
| 8,825,842 | B2 | 9/2014 | Papakipos et al. |
| 8,838,581 | B2 | 9/2014 | Tseng |
| 2004/0169666 | A1* | 9/2004 | Shigetake ......... G06F 17/30905 345/636 |
| 2004/0225723 | A1* | 11/2004 | Cherkasova ............ H04L 29/06 709/219 |
| 2007/0106455 | A1* | 5/2007 | Fuchs .................... G01C 21/32 701/438 |
| 2008/0147777 | A1* | 6/2008 | Azulai .................... G06F 9/541 709/202 |
| 2009/0063614 | A1 | 3/2009 | Donawa et al. |
| 2010/0257113 | A1 | 10/2010 | Dorrell |
| 2010/0293105 | A1 | 11/2010 | Blinn et al. |
| 2011/0125846 | A1 | 5/2011 | Ham et al. |
| 2012/0195321 | A1* | 8/2012 | Ramanujam ........ H04L 12/4637 370/405 |
| 2013/0208719 | A1* | 8/2013 | Aloush ................... H04L 12/56 370/390 |
| 2013/0332858 | A1 | 12/2013 | Weber et al. |
| 2014/0089418 | A1* | 3/2014 | Davenport .............. H04L 51/14 709/206 |
| 2014/0280556 | A1 | 9/2014 | Kazi et al. |
| 2015/0131845 | A1* | 5/2015 | Forouhar ........... G06K 9/00724 382/100 |
| 2015/0172957 | A1* | 6/2015 | Sarawat ................ H04W 48/06 370/235 |

OTHER PUBLICATIONS

Millen, et al., "Stimulating social engagement in a community network", In Proceedings of the ACM conference on Computer supported cooperative work, Nov. 16, 2002, 8 pages.

"Second Written Opinion Issued in PCT Application No. PCT/US2016/025953", dated Mar. 23, 2017, 6 Pages.

"International Preliminary Report on Patentability Issued in PCT Application No. PCT/US2016/025953", dated Jun. 30, 2017, 9 Pages.

Wang, et al.,"A Survey and Comparison of Multiring Techniques for Scalable Battlespace Group Communications", In the proceedings of proceedings of International Society for Optics and Photonics, vol. 5820, May 26, 2005, pp. 21-32.

* cited by examiner

1600

| DEPTH | M(R=3) | T(R=3) | M(R=8) | T(R=8) |
|---|---|---|---|---|
| 0 | 1 | 3 | 1 | 8 |
| 1 | 4 | 12 | 9 | 72 |
| 2 | 13 | 39 | 73 | 584 |
| 3 | 40 | 120 | 585 | 4680 |
| 4 | 121 | 363 | 1756 | 14048 |
| 5 | 364 | 1092 | 5269 | 42152 |

FIG. 7

DISTRIBUTED PROCESSING OF SHARED CONTENT

BACKGROUND

Sharing and distributing information in the connected world is becoming increasingly prevalent as more and more users have access to various content through a variety of sources. Large volumes of such content are published and distributed across systems and networks, resulting in mass amounts of data to be stored and processed in an efficient manner. Popular websites and networks, such as social media websites, are increasingly becoming popular with a wide-range of users. Users of these social media sites have the ability to update status information to inform members of a current thought, activity, event, mood, etc. These updates can be directed to user-generated content, links to content, and/or commercial social media content. For example, a user may update a profile status on the social network to share information or content such as a link, document, or other events occurring with members of the user's social network. Members that are "friends" of the user's social network typically have access to the user-generated content, such that the content may be viewed by each member upon distribution of the content by the user. Thus, an endless stream of content may be continually distributed over social networks.

Compounding the increasingly large amounts of information requiring processing and distribution is the ease of accessibility to content using technologies such as smartphones and tablets. Moreover, the amount of content being distributed is constantly increasing as the number of users increase and the type of content being distributed become larger and larger in size. This not only requires increased computing resources and power, but also management of the content distributed to any one particular user or group of users. Nevertheless, efficient distribution of content becomes increasingly difficult to maintain and follow due to the large volume of data being received on a constant and daily basis.

SUMMARY

The present disclosure, generally described, relates to technology for distributing information in a network. The information may be distributed to multiple storage locations in a controlled, efficient and predictably scalable manner.

More specifically, the technology relates to a selection process between a direct distribution of information and a distributed and parallel distribution of information within or across networks. When a user broadcasting information decides to distribute content to a limited number of users, the system will distribute the information using a direct mechanism. The direct mechanism may be, for example, a direct iterative mechanism or a direct parallelized mechanism for distribution of the information. If, on the other hand, the user broadcasting the information is distributing to a large number of users (e.g., where a large number of users may be determined based on satisfying a threshold requirement), the system may distribute the information using a distributed and parallel processing mechanism. The distributed and parallel processing mechanism includes multiple processing nodes arranged in a recursive manner, with each processing node formed of multiple processing sub-nodes organized in a ring-like topology. The processing nodes may also have varying depths or hierarchal levels which allow for the propagation of the information in an efficient manner without exhausting computing resources. Each of the processing sub-nodes has containers that store the information as it is propagated across the network, where each of the processing sub-nodes is responsible for processing and managing the information stored in a respective container.

By virtue of this technology, a maximum amount of time required to propagate the information within a system may be provided even as the number of users and amount of information continuously increases within the system over time. In order to provide such a measurement of propagation time, the number of operations or steps to propagate the information should remain constant or increase sub-linearly relative to an increase in the amount of user activity in the system. The system, in one application of the technology, may be applied to a social network environment in which users constantly distribute social events to a large volume of members across the network. In this respect, the technology externalizes the social network management from the broadcast selection and distribution mechanism, such that handling of member profiles and preferences may be conducted separately from the distribution and propagation of information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 depicts an exemplary table illustrating sample calculations for processing information simultaneously in distributed processing nodes.

DETAILED DESCRIPTION

Technology for distributing information to multiple storage locations in a controlled, efficient and predictably scalable manner is described herein. Upon a request to broadcast information in a network, the technology utilizes a selection process to decide between a direct distribution of the information, and a distributed and parallel distribution of the information. Specifically, when the number of users receiving the broadcast information remains below a threshold, the information is distributed using the direct process. When the number of users receiving the broadcast information meets or exceeds the threshold, the information is distributed to the users using a distributed and parallel process. The information is distributed from a container of a processing sub-node to other containers in other processing sub-nodes. The information is distributed from processing sub-node to processing sub-node based on a one-directional sub-node pointer. The processing sub-nodes together form a processing node having a ring-like structure. The information may also be distributed from one processing node to a different processing node when a connection pointer exists at any one processing sub-node and is directed to the different processing node from the processing sub-node. The technology also provides the ability to determine a maximum amount of time it takes for the information to propagate across the network, even as the number of users and amount of information continuously increases over time. Accordingly, the system may efficiently distributed information in a predictably scalable manner without exhausting system resources. In one embodiment, the technology is useful in distributing information in a social network and will be described herein with respect to a social network. It will be understood that the technology is useful in any number of various information distribution applications.

Figure 1:
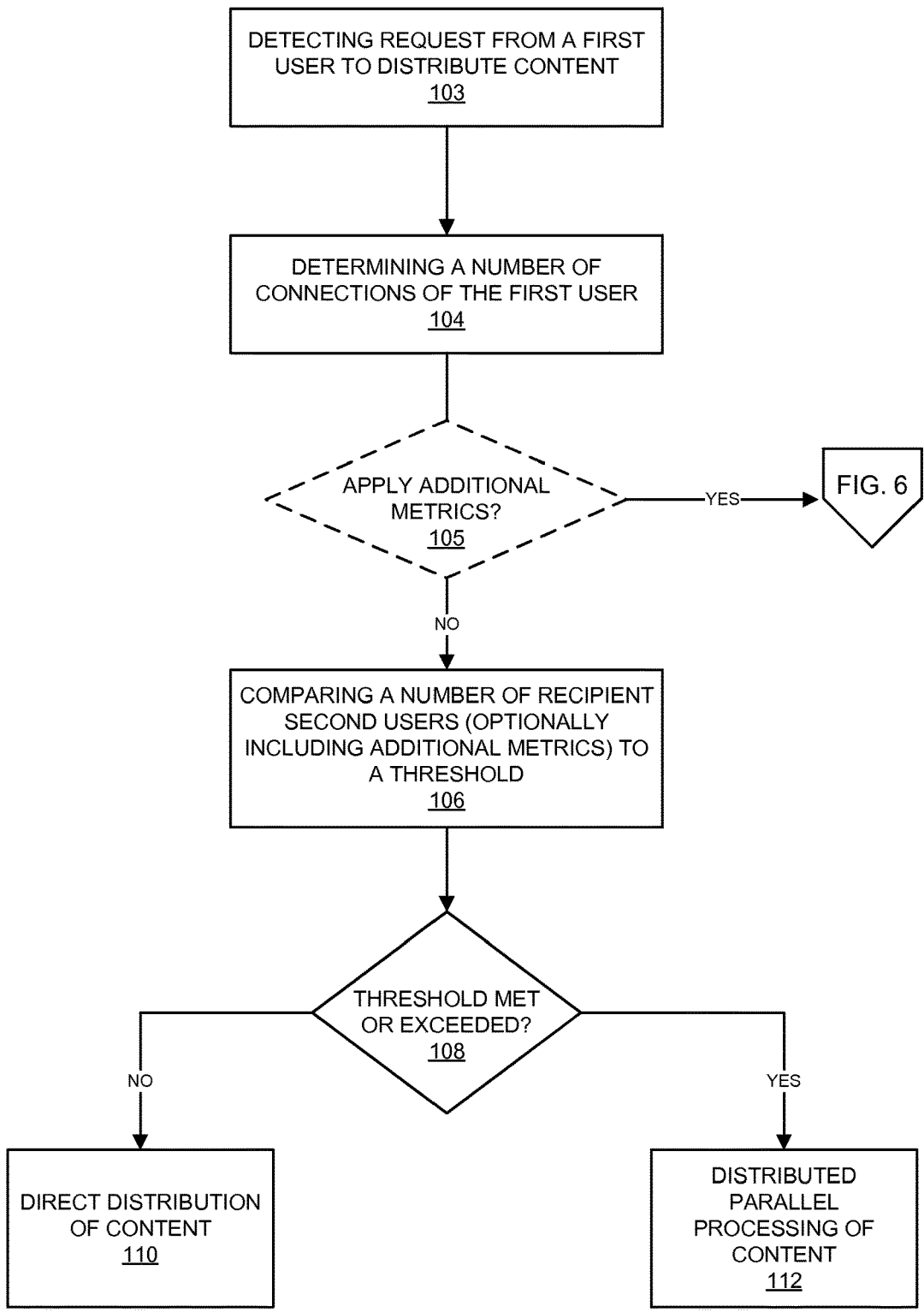
FIG. 1 depicts an exemplary flow diagram of distributing information in a network.

FIG. 1 depicts an exemplary flow diagram of distributing information in a network. The process depicted in FIG. 1 describes a selection between the direct distribution of information and the distributed and parallel distribution of information. In the direct distribution of information, information (or content) is directly distributed from a first user (i.e., a broadcast user) in an iterative or parallelized manner to a second user or users (i.e., recipient users). In the distributed and parallel distribution of information, the content is distributed to recipient users in a distributed and parallel manner. Thus, after a broadcast user decides to distribute content, but prior to actual distribution of the content to the recipient users, the system determines whether to distribute the content using the direct process or the distributed and parallel process. This selection process enables the system to distribute the content in the most efficient manner, while utilizing the least amount of system resources and preventing unnecessary iteration of data to a potentially large volume of recipient users. Information, also referred to herein as data or content, may include but is not limited to text messages, photos, video, music, audio data, social media, blog entries, website URLs, virtual information, links to such data and any other content or information that may be processed, stored or distributed throughout the system.

Implementation of the process begins when a computing resource, for example a computing resource described below with respect to FIG. 2, initially monitors the system or network to detect a request from the broadcast user to distribute content at 103. A computing resource, as the term is defined herein, may include any one of or an aggregate of available computer hardware or software in a computing system or network. Thus, a computing resource may include any one or more of, but is not limited to, a device connected to the system or network, a system or network component (internal or external to the system or network) and a software or virtual component available to the system or network. Non-limiting examples include servers, computers, processors and applications residing therein. Determination by the computing resource that a request has been made may be based, for example, on the broadcast user selecting a "share" or "post" menu item on an interface of a user device, or may be based on a more complex analysis, such as the computing resource identifying an increased amount of traffic on any particular path that content is being distributed within the network to a particular group of second users (such as recipient users "following" the broadcast user). Moreover, the distribution request may be identified based on the nature of the content. For example, if the content is related to a new movie in which the broadcast user is an actor or actress, then the computing resource may identify the content to be distributed as content related to the broadcast user based on the knowledge that the broadcast user is acting in the new movie. It is appreciated, however, that any means for detecting a content distribution request may be used, and that the described embodiments are non-limiting.

At 104, the computing resource determines the number of connections to which the broadcast user will be distributing the content. The number of connections may be determined, for example, by the computing resource retrieving a distribution list associated with the broadcast user that identifies the recipient users, or some form of directory system, such as the an LDAP or Active Directory® system, that associates or correlates the recipient users with the broadcast user. The number of connections may also be based on the computing resources understanding that the broadcast user rarely distributes content to less than a threshold number of recipient users or has a predefined group of recipient users for which the content is regularly distributed. For example, a broadcast user may have a specific group of followers (recipient users) with more than a threshold number of members in the group. Thus, when the content is being distributed to this specific group of followers, the computing resource identifies the group and determines that the number of connections is greater than the threshold number, without calculating or determining the exact number of connections. On the other hand, if the broadcast user is distributing content to an unknown number of followers (such as sending content to an organization or business without knowledge of the number of employees), the computing resource may calculate and determine the number of connections for which the content is being distributed. It is appreciated that the disclosed determination of the number of connections is exemplary and non-limiting, and that any means for identifying the number of connections may be used.

At 105, the process optionally applies additional metrics when determining whether the number of connections meets or exceeds the threshold number. The application of additional metrics results in additional calculations to determine, for example, the number of connections (or recipient users) or amount of resources required to process the content. A description of the optionally applied and additional metrics is described in more detail with reference to FIG. 6. If additional metrics are not being applied (or following the application of the additional metrics), the determined number of connections is then compared to a threshold number at 106. The threshold number may be selected based on the size of the system and the computing resources available as determined, for example, in the description related to FIGS. 7-9 below. In general, the threshold number is set such that the system will select either the direct process or the distributed and parallel process to most efficiently process and distribute the content being distributed by the broadcast user and without garnishing all of the system resources. For example, the threshold number may be a predetermined value that is selected, for example, based on the efficiencies of the particular system as it relates to the number of recipient users (e.g., followers of the broadcast user). For example, in a system comprised of ten servers to process content, the threshold value may be set to eleven. Using this example, if content is being distributed to eleven or more recipient users, then the threshold value has been met or exceeded. If, on the other hand, the content is being distributed to ten or less recipient users, then the threshold value has not been met or exceeded. It is appreciated that the embodiments described are non-limiting, and that the threshold value need not be a constant value and may vary based on a variety of factors not otherwise described in the exemplary embodiments.

When the computing resource determines that the number of connections (or recipient users) is less than the threshold number at 108, then the content is distributed using the direct process at 110, which process is described in more detail with reference to FIG. 3. If, on the other hand, the computing resources determine that the number of connections (or recipient users) meets or exceeds the threshold number at 108, then the content is distributed using the distributed and parallel process at 112, which process is described in more detail with reference to FIG. 5.

Figure 2:
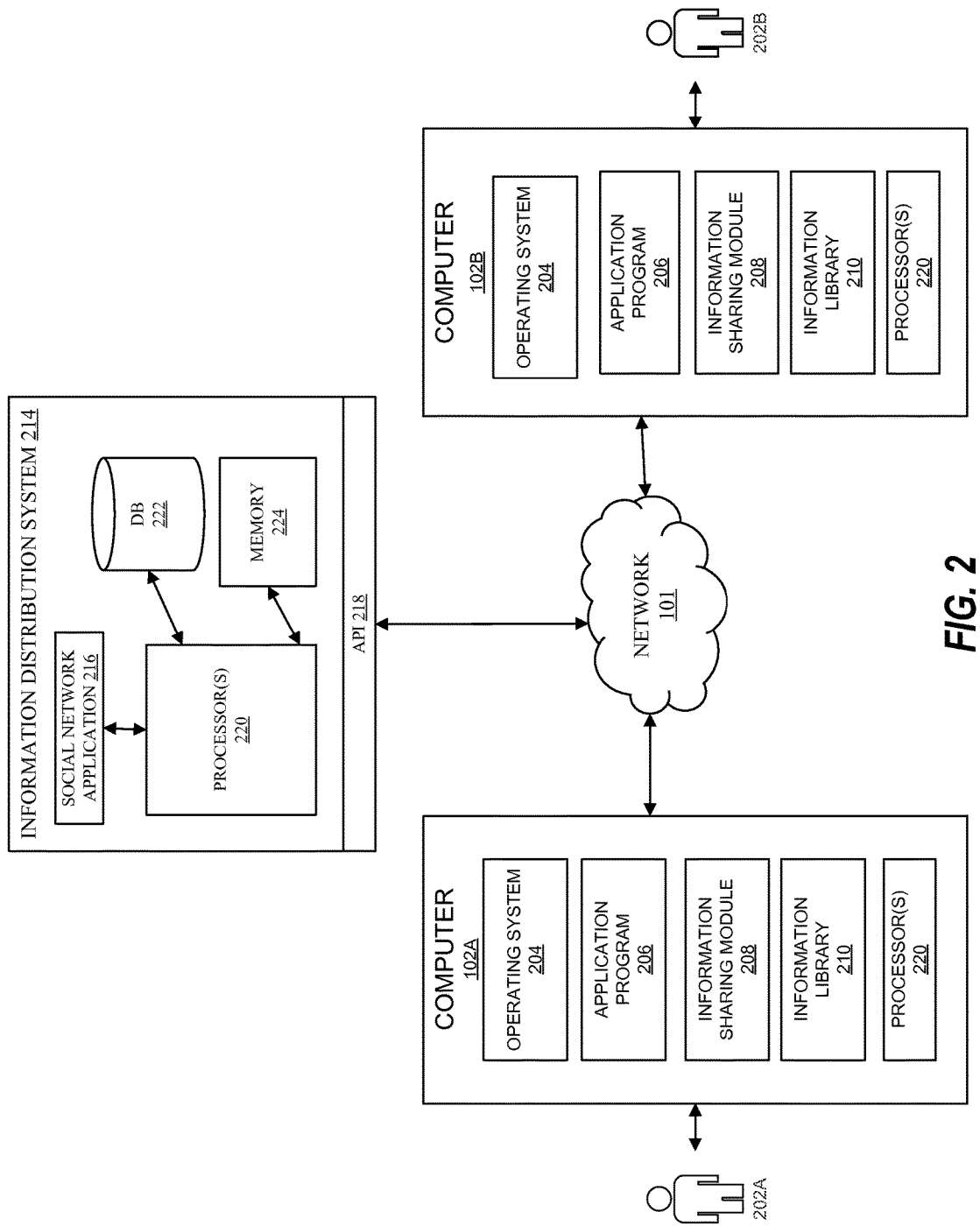
FIG. 2 depicts an exemplary operating environment of a network in accordance with FIG. 1.

Referring now to FIG. 2, an exemplary operating environment is shown in which the process of FIG. 1 may be implemented using the computing resources as discussed above. The operating environment includes computing resources, such as computers 102A and 102B (collectively computers 102) that may be operated by a broadcast user 202A or a recipient user 202B), a network 101 and an information distribution network system 214 system 214. More specifically, the computer 102A may be configured to execute an operating system 204, an application program 206, and an information sharing module 208. The computer 102A is also configured to store content, for example, in an information library 210, for use by one or more hardware and/or software components of the computer 102A. According to various embodiments, the computer 102A includes a standard desktop or laptop personal computer system. It should be appreciated, however, that the computer 102A may include other types of computing systems, including a server computer, a handheld computer, an embedded computer system, a personal digital assistant, a mobile telephone, or another type of computing device known to those skilled in the art. Additionally, it is appreciated that the users are typically individuals, but may also be a group of individuals, business(es) or other types of organizations or entities.

The operating system 204, as well understood, is a computer program for controlling the operation of the computers 102. The application program 206 is an executable program configured to execute on top of the operating system 204, and may include any type of application program including. As will be discussed below, the various technologies presented herein for sharing may be utilized with virtually any type of application program 206 that receives and performs commands based upon input provided by a user. Additionally, an information sharing module 208 executes in conjunction with the application program 206 to provide the computers 102 with the functionality disclosed herein for providing content sharing. While the information sharing modules 208 are illustrated as distinct entities, it should be appreciated that the functionality disclosed herein as being performed by the information sharing module 208 may be provided by the application program 206 or another component of the computers 102. According to other implementations, the sharing module 208 may operate in conjunction with the operating system 204 and/or the application program 206 to provide sharing of content within a social network. In this regard, it also should be appreciated that the functionality disclosed herein as being performed by the information sharing module 208 also may be incorporated directly within the operating system 204 and/or the application program 206.

The computers 102 may be connected to one or more networks 101, and may operate in conjunction with other computing systems on or in communication with the network 101 to provide the functionality described herein. Network 101 may be any public or private network, or a combination of public and private networks such as the Internet, a public switched telephone network (PSTN), or any other type of network that provides the ability for communication between computing resources, components, users, etc. In some embodiments, the computers 102 communicate with an information distribution network system 214 that operates on, or in communication with, the network 101. In the exemplary embodiment, the information distribution network system 214 is accessible via the network 101, and provides a social networking service to users who connect to the information distribution network system 214. The information distribution network system 214, which may comprise one or more servers, includes a social networking application 216, an API 218, a processor(s) 220, a memory 224, and associated database 222. Database 222 may be one or more databases, storage systems or any other know device capable of storing data. Users can connect to the information distribution network system 214 to control and/or access features of a social networking service in several ways. For example, users can access the features via a social networking site generated by the social networking application 216, via the API 218, via a back end interface (not illustrated) with the information distribution network system 214, or via other connections and/or interfaces. Through the information distribution network system 214, users may distribute and receive content that will be placed in containers for such access, as described in more detail below. It should be understood, however, that the content stored in the information library 210 of the computer 102B may differ from the content stored in the information library 210 of the computer 102A. In other words, while the function of the information libraries 210 of respective computers 102 may be similar, the actual data content of the respective information libraries 210 may differ. Additionally, processor(s) 220 is operative with database 222, memory 224, and API 218 to effectively manage or regulate communications within a social group of a social network.

Figure 3:
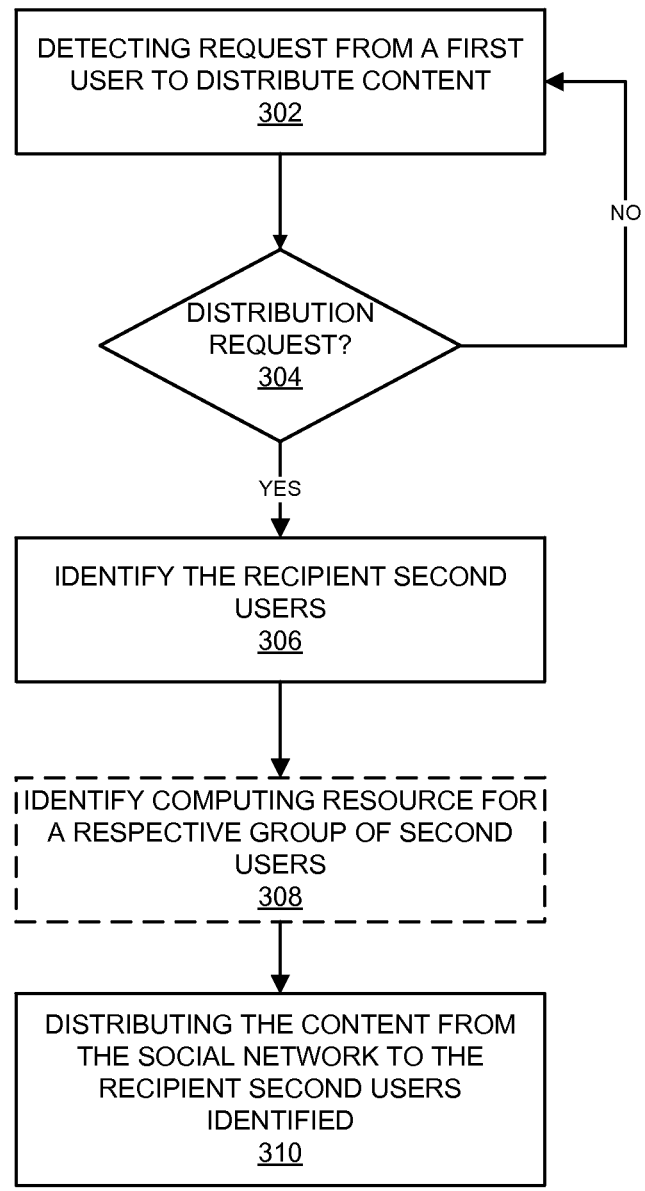
FIG. 3 depicts a flow diagram illustrating direct distribution of information in in a network using the system of FIG. 2.

FIG. 3 depicts a flow diagram illustrating direct distribution of information using the system of FIG. 2. The process of distributing content can be accomplished using any of the available computing resources. In one embodiment, a computing resource such as the information distribution network system 214 operates to distribute the content. Initially, a request from a broadcast user 202A is detected at 302 (also identified as item 103 in FIG. 1). The request may be for example, to distribute content on the social network to a group of users (e.g., recipient users 202B). Once the information distribution network system 214 detects such a request on the social network, the request is examined by the information distribution network system 214 to determine whether the request is a request to distribute content at 304. If the information distribution network system 214 determines that the request is not related to distribution of content, then the information distribution network system 214 continues to monitor the social network for further distribution requests and returns to 302. At 306, the recipient users 202B receiving the distributed content from the broadcast user 102 are identified. The identification of recipient users 202B may be performed by the information distribution network system 214 with respect to all of the recipient users 202B. Alternatively or optionally at 308, identification may be performed by any other computing resource. Identification of recipient users 202B may be in the form of, for example, a distribution list associated with the broadcast user and stored in a database 222 of the social network, or managed by the respective computing resources that may identify recipient users 202B as being authorized to receive the distributed content. The identification of recipient users 202B to receive the distributed content may be performed using known database query techniques, and algorithmic matching of the metadata about both the content and the users.

At 310, upon receiving the content from the information distribution network system 214, the content is transmitted to containers associated with the respective recipient users 202B. That is, the content distributed by the broadcast user 202B is distributed to the containers of the recipient users 202B identified in 306. Containers store the distributed content for each recipient user 202B such that a respective recipient user 202B may access the content using computers 202. Containers are further described below with reference to FIG. 4. Construction or format of the distributed content is dependent, for example, upon the particular embodiment and/or the configuration settings of the controlling social network and network settings. In one exemplary embodiment, construction of the content depends upon the delivery method that are intended to be used for each recipient user 202B. For example, the format of a Twitter message will be different than the format of an e-mail message, which will be different than the format of a Facebook message, etc. Accordingly, recipient users 202B are distributed content using a direct process that originates with the broadcast user's request for distribution of content.

Figure 4:
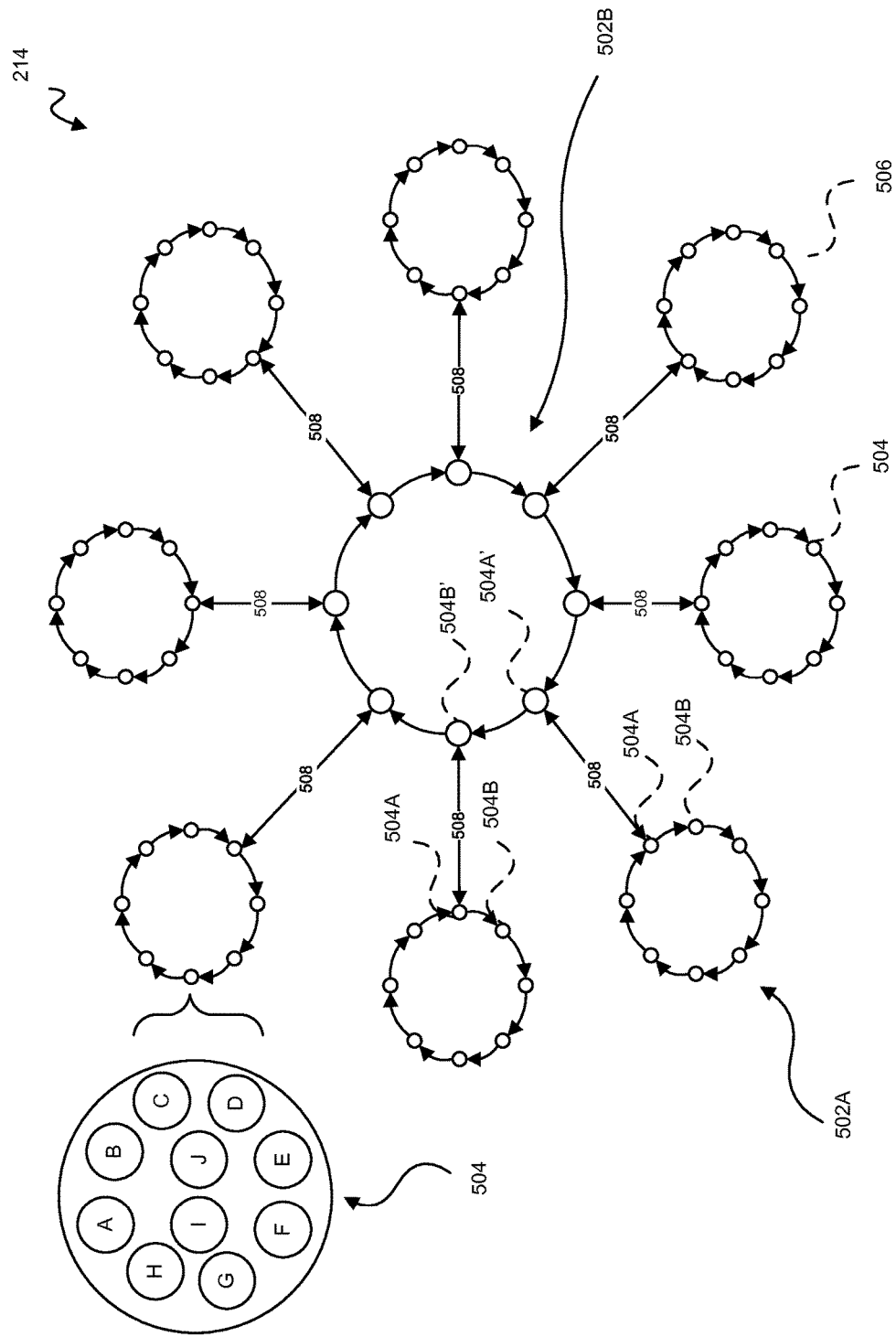
FIG. 4 depicts an exemplary diagram of one embodiment for directing distribution of content in a network using the system of FIG. 2.

FIG. 4 depicts an exemplary diagram for directing distribution of content in a network using the system of FIG. 2. The computing system illustrated in FIG. 4 represents one embodiment of the information distribution network system 214 illustrated in FIG. 2 and includes processing nodes 502A and 502B (collectively, processing nodes 502) formed as a recursive structure with a ring-like topology such that distribution of content may occur at scale. The processing nodes are formed by processing sub-nodes 504 that may comprise any combination of a physical processing and storage devices, or physical or logical partition of processing and storage devices, that enables propagation of the content to the appropriate recipient users in a parallel manner. Each of the processing sub-nodes 502 has one or more containers or "buckets" A-J comprising portions of storage devices that store the content as it is propagated across the system. Moreover, each of the processing sub-nodes 504 is responsible for processing and managing the content stored in respective containers. The processing sub-nodes 504 forming the processing nodes 502 may be, for example, one or more computing resources such as a system 214 and/or processors 220. Processing sub-nodes 504 may also be comprised of any computing resource known in the art and capable of processing data in accordance with the processes described herein, such as computers 102. For example, a processing sub-node 504 may be part of a server or processor that may be physical hardware, such as a server, processor or computer, or any well-known computing resource, or a logical partition of the physical hardware, such that the physical device is divided into independent resources that operate independently. The physical hardware is limited by the hardware resources, such that any one device may not be larger than the physical constraints of the physical resource. For example, a server with 10 gigabytes (GB) of storage may not be partitioned into sections exceeding the 10 GB capacity. Thus, the size of any partition is naturally constrained and influenced by the physical structure of the resource. However, logical partitions may be used to manage the constraints placed on the physical partitions such that multiple "layers" of partitions are formed within the physical layer at the bottom of the layered stack, as well-known in the art. One such system that may be used to implement the various physical and logical requirements for use herein is document DB™, although implementation is not limited to such a system. It is appreciated that the processing nodes themselves may also be structured in a manner similar to the processing sub-nodes. A detailed description of the various system resources and components will not be repeated herein. Reference can be made to the various diagrams provided above.

The processing sub-nodes 504 forming processing nodes 502 are each responsible for processing data that is being distributed across the system. This is accomplished by each processing sub-node 504 within a processing node 502 processing and managing the distributed data for which it is determined to be responsible. For example, processing sub-nodes 504 may be responsible for processing a particular set of data and/or managing an assigned set of users. A directory system, such as an LDAP or Active Directory® system, may be used in one embodiment to identify which processing sub-nodes 504 are individually responsible for processing and managing such data and users 202 across the system. Additionally, each of the processing nodes 502 may be formed at different hierarchal levels or depths to thereby generate a tree-like data structure to propagate information in a distributed and parallel manner using, for example, the system depicted in FIG. 2. The level or depth of a processing node is defined as one plus the number of connections between the node and the innermost processing node. In the depicted example, processing node 502B is the root or innermost node and resides at a hierarchal level or depth of "1," and processing node 502A is an internal or branch node and resides at hierarchal level or depth of "2" (one+one connection). In one exemplary embodiment, a processing node 502A at a different hierarchal level from processing node 502B is formed when a processing sub-node (for example, processing sub-nodes 504A' and 504B') of processing node 502B is branched out into another processing node 502A, which processing node 502A comprises another set of processing sub-nodes (for example, processing sub-nodes 504A and 504B). While the illustration depicts two hierarchal levels, the disclosed example is non-limiting. It is appreciated that the number of hierarchal levels is only limited by the available computing resources, as described above.

Each processing node 502 is an arrangement of processing sub-nodes 504 in which a first of the processing sub-nodes 504A points (via sub-node pointer 506) to a second (and other) of the processing sub-nodes 504B. The sub-node pointer 506 may be implemented as a logical pointer in which one logical partition of one processing sub-node 504A points to another logical partition of another processing sub-node 504B. Likewise, physical partitions may be connected (or pointed) to each other as a means for recursively distributing data within the processing node 502. A pointer, as the term is used herein, generally refers to a programming object whose value refers to (or "points" to)

another value stored in a different portion of storage or memory by use of its storage or memory address. For example, in the illustrated embodiment, sub-node pointers 506 from processing sub-node 504 to processing sub-node 504 are unidirectional in one exemplary embodiment, such that any data being distributed from one processing sub-node 504 to another processing sub-node 504 propagates in one direction. Thus, the processing nodes 502 include processing sub-nodes 504 formed in a recursive manner such that each processing sub-node 504 points to another, different processing sub-node 504 in the same processing node 502 (forming illustratively what appears in the drawing as a ring-like topology or processing node). Additionally, a processing sub-node 502 may have a connection pointer 508 from a first processing sub-node 504B' in a first processing node 502B to a second processing sub-node 504A in second processing node 502A. A connection pointer 508 from one processing sub-node 504 to another processing sub-node 504 in a different processing node is referred to herein as a bi-directional pointer 508. Thus, a bi-directional pointer 508 connects one processing node 502B to another processing node 502A. It is appreciated that the pointers in the exemplary embodiments are shown as unidirectional or bi-directional to form a ring-like topology. However, the pointers are not limited to the disclosed embodiments and may also be used to form a mesh or any other well-known topology.

Also illustrated in FIG. 4 is an exploded view of processing sub-node 504, which includes ten containers A-J. Containers A-J may be populated, for example, with content that has been distributed by various broadcast users 102 on the network. A container(s) may be part of a storage system or a storage module that may be physical hardware, such as memory 224 or database 222 or any well-known recording media, or a logical partition of the physical hardware, such that the storage system or storage module is divided into independent resources and operates independently for any one container. It is also appreciated that the containers may be any readily available storage component(s), such as a redundant array of independent disks (RAID) or any well-known failure-resistant storage technology. Thus, a processing sub-node 504 may include its own storage system or be partitioned into any number of hosted containers for storing content being distributed in the network. Moreover, the processing sub-nodes 504 may also be balanced such that no one processing sub-node 504 consumes or overly consumes computing resources. It is also appreciated that although the containers described and illustrated herein may be associated with a single user, a container may also be associated with a group of users, a business entity, an organization or any other type of "user" that may be connected to the network. Users may also have one or more containers associated with them on the network, and the containers may be of varying size as well as increase or decrease in size as the volume of data stored therein increases or decreases.

In one exemplary implementation of the computing system of FIG. 4, a broadcast user 202A decides to distribute content on a social network to all of his or her "followers" (or recipient users 202B). The broadcast user 202A, in this example, has a number of recipient users 202B that exceeds one million. Distribution of the content by the broadcast user 202A will be initiated and processed by a processing sub-node 504 associated with the broadcast user 202A in one of the processing nodes 502 (the processing node may be at any hierarchal level). From the processing sub-node (herein 504A') associated with the broadcast user 202A, the distributed content is propagated to another processing sub-node (herein 504B') and to each of the other processing sub-nodes in processing node 502B for parallel processing. In the depicted example, each of the processing sub-nodes 504 is a device, such as a computing resource, that operates independently, as diagrammatically represented by a sub-node pointer 506 pointing from one of the processing sub-nodes 504 to another of the processing sub-nodes 504. Moreover, each of the processing nodes 502, comprising processing sub-nodes 504, is a group of devices operating independently from another one of the processing nodes 502, as diagrammatically represented by a pointer 508 pointing from one of the processing nodes 502B to another of the processing nodes 502A. Thus, in the exemplary embodiment, when a broadcast user 202A with millions of connections shares content across the network, the content traverses (propagates) through a processing node 502 by distribution from processing sub-node 504 to processing sub-node 504, and each processing node 504 may become a parallel path for continued distribution of the shared content in a similar manner. Accordingly, the system is able to propagate and distribute data in an efficient manner without iterating over millions and millions of users, and reducing the likelihood of draining computing resources in the system.

In another exemplary implementation of FIG. 4, each of the nine processing nodes 502 manages and processes ten million users. Each of the processing sub-nodes 504 of processing nodes 502 includes ten containers. Thus, if there are eight processing sub-nodes 504 in each of the processing nodes 502, there are a total of eighty containers in each of the nine processing nodes 502. To balance each of the eight processing sub-nodes 504 for efficient management and processing by a computing resource, each of the eight processing sub-nodes 504 should manage a similar amount of data. If it is assumed for purposes of discussion that each user produces the same amount of data, then each of the eight processing sub-nodes 504 is responsible for managing one million two-hundred and fifty thousand users (ten million users divided by eight sub-nodes), and each of the ten containers in each of the eight processing sub-nodes may be responsible for storing data for one hundred and twenty-five thousand users (one million two-hundred and fifty thousand users divided by ten containers). As the amount of users and data increases, the system may also increase in size (i.e., additional processing nodes and processing sub-nodes are added to the system), such that more and more parallelization may occur. That is, the degree of parallelization is dependent on the number of computing resources available. It is appreciated that while the exemplary embodiment is directed to propagation of data from an innermost node to an outermost node, the propagation is not limited to such an embodiment. Thus, data may be propagated from any processing sub-node of a processing node within the hierarchal level system and in any direction, based on the particular path of the data and the connections associated with the data being distributed by a user.

Figure 5:
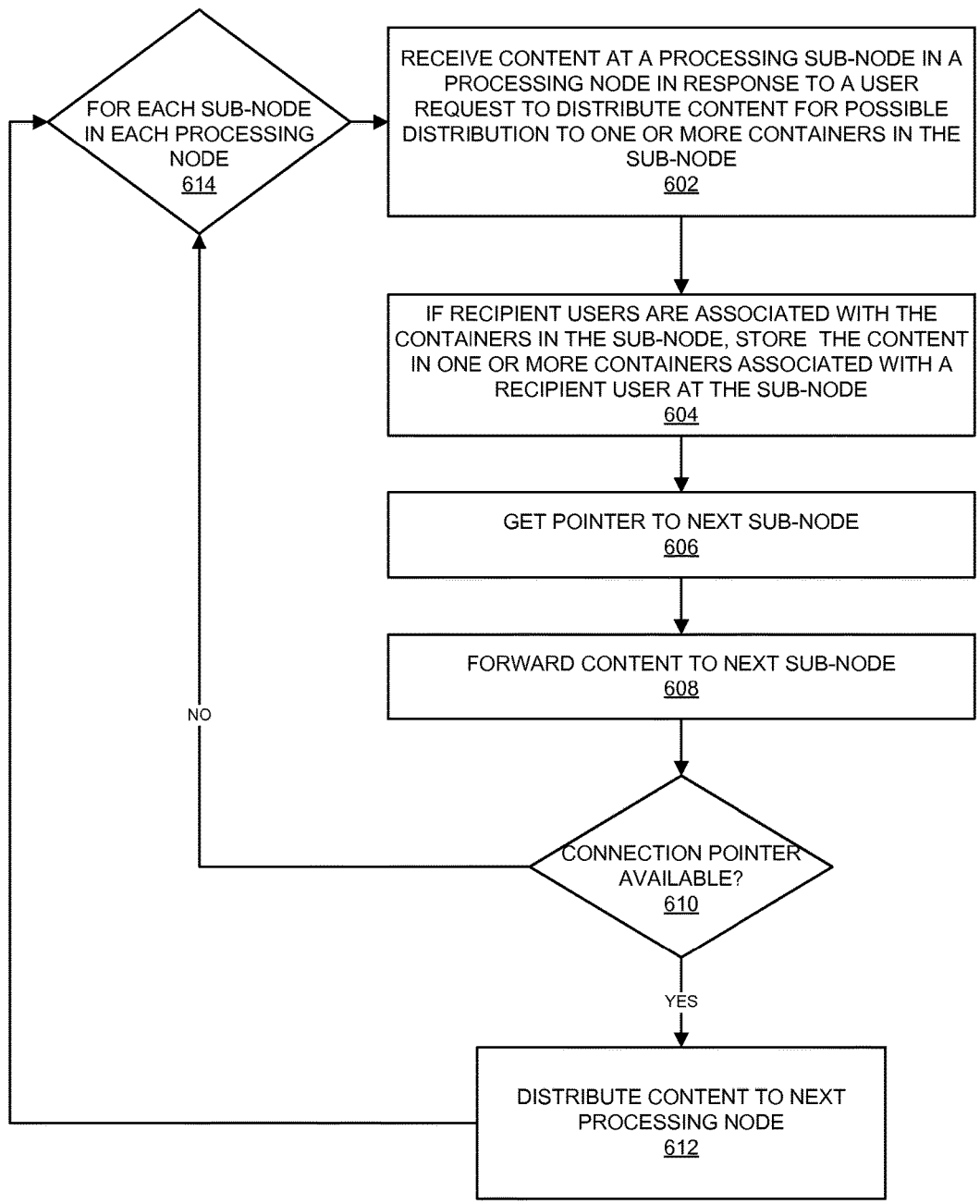
FIG. 5 depicts an exemplary flow diagram of distributed and parallel processing for distributing information in a network using the system of FIG. 2.

FIG. 5 depicts an exemplary flow diagram of distributed and parallel processing for distributing content in a network using the system of FIG. 2. The process described herein may be implemented by any of the computing resources described above, for example any of the computing resources described in FIGS. 2 and 4. In one exemplary embodiment, system 214 operates to implement the described process. In particular, each of the processing sub-nodes 504 processes the content as it propagates from processing sub-node 504 to processing sub-node 504 (and processing node 502 to processing node 502) in a nearly simultaneous manner such that the content is effectively processed in a parallel manner. The process of distributed and parallel processing of content begins at 602 where the content is received at a first processing sub-node 504 in a first processing node 502 upon a request of a first user to distribute content to possibly one or more containers A-J in the processing sub-node 504. For example, a broadcast user 202A may request that content be distributed in a social network to a group of followers (recipient users 202B). The content to be distributed may be received from any storage device communicatively coupled to the social network, such as database 222 or memory 224, or from any other computing resource, such as computers 102 (FIG. 2). The received content may be stored in a container (such as containers A-J of FIG. 4) associated with a recipient user 202B if the recipient users 202B are associated with the containers A-J, deemed destination containers, in the processing sub-node 504 at 604. At 606, the processing sub-node 504 retrieves a pointer 506 that points to a next processing sub-node 504 within the same processing node 504. At 608, the content is forwarded from the processing sub-node 504 to the next processing sub-node 504 in the same processing node 502 as directed by a sub-node pointer 506. For example, the content is received at first processing sub-node 504 of a first processing node 502 and recursively distributed to each other of the processing sub-nodes 504 in the first processing node 502. The content is stored in one or more containers A-J of each first processing sub-node 504 when the container is a destination container (i.e., the container is associated with a second or recipient user 202B having a connection with the first or broadcast user 202A). That is, as content propagates from processing sub-node to processing sub-node, any container associated with followers of the broadcast user 202A stores the distributed content. At 610, the processing sub-node checks to determine if a connection pointer 508 is available. If the processing sub-node has a connection pointer 508, then the content is distributed from the processing sub-node 504 at first processing node 502 to another processing sub-node 504 at another processing node 502 (a processing node at a different hierarchal level or depth), at 612. For example, content is propagated from processing sub-node 504A' of processing node 502B to processing sub-node 504A of processing node 502A (FIG. 4). After distribution of the content to the processing node 502 at a different hierarchal level, the process returns to 602 for each sub-node in a processing node, at 614. If no connection pointer 508 exists as the processing sub-node 504, then the process returns to 602 for each sub-node in a processing node, at 614. As the content is distributed, the computing resources process the content at 614 and thereby effectively provide a distributed and parallel processing of the content. It is also appreciated that users may be notified when content becomes available in an associated container, and that the content may be displayed on a user's device in response to a request to retrieve and display such content.

Figure 6:
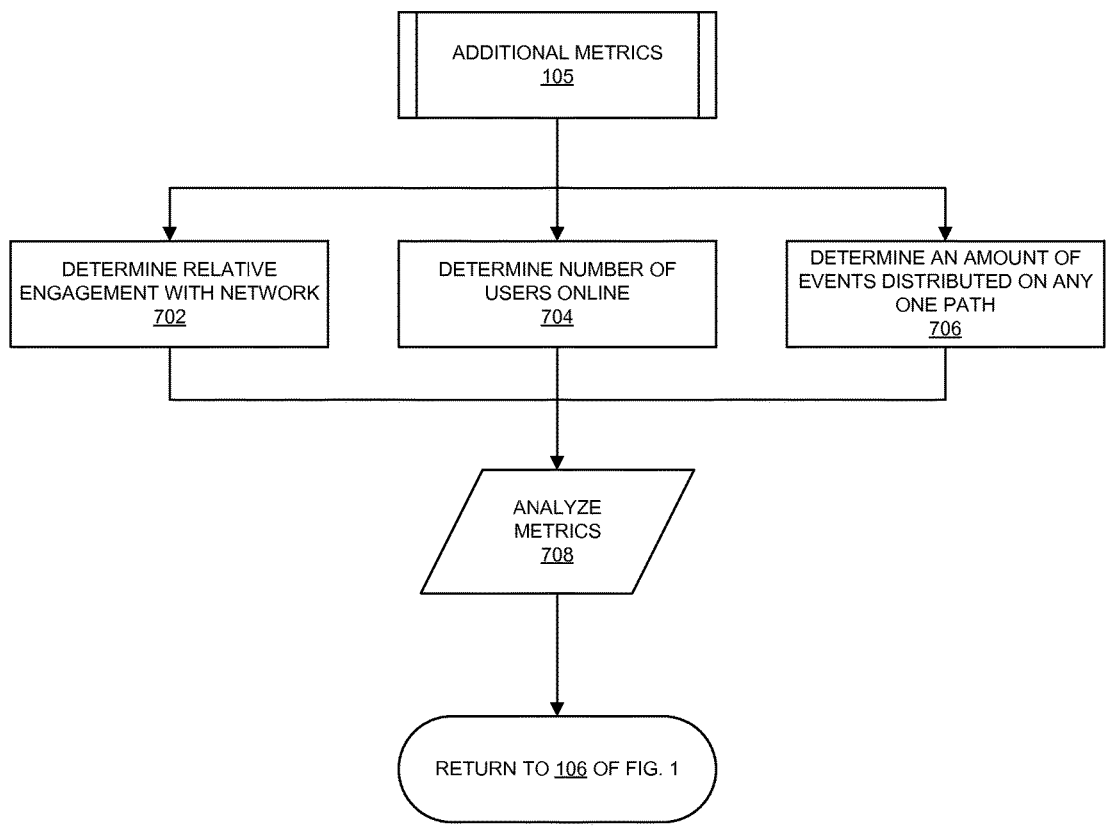
FIG. 6 depicts an exemplary flow diagram of metrics applied to the threshold determination of FIG. 1.

FIG. 6 depicts an exemplary flow diagram of metrics applied to the threshold determination of FIG. 1. In conjunction with the distribution of content associated with the processes of FIG. 1, if a computing resource determines that additional metrics should be applied, then the following process is implemented. Metrics may be defined as a quantifiable measurement of a characteristic of a performance of an individual or an organization, or of a system or component or resource on the system. In one example, the metrics may identify the threshold numbers that should be utilized to determine whether the number of connections has exceeded the threshold number for a particular distribution of content. As illustrated, the additional metrics include, but are not limited to, determining the relative engagement with a social network (702), determining a number of users online in the social network (704) and determining the number of events (or amount of content) being distributed along any one path in the social network (706). Any one or any combination of these metrics, including the number of connections to recipient users may be analyzed by the computing resources to calculate which of the two solutions—direct process or distributed and parallel process, should be selected from processing of the distributed content by the broadcast user 202A. Similarly, the above described metrics may be stored in a networked database, such as database 222 or memory 224, for retrieval by the computing resources. The definitions may be used, for example, to generate or modify metrics specific to the social network, and in particular, for defining ways in which to calculate and determine the amount of bandwidth use and number of connections on the social network at any point in time. Additionally, this allows for the system to be reactive (dynamic) and intelligently determine which of the two solutions to employ for any one activity or event in executing distribution of the social event.

With respect to determination of the relative engagement with the social network (702), this metric may determine, for example, how many social network members are active at any point in time, or more specifically, how many social network members following a particular other member are active at any one point in time. The computing resources may also calculate the total number of users online at any point in time on the social network (704), active or nonactive, or determine the number of events being distributed on a single path within the social network (706), such as how much content is being distributed along a network path and the amount of bandwidth the path is capable of handling. These metrics are analyzed at 708 by the computing resources. Data collected based on the individual or collective determinations at 702, 704 and 706 may be analyzed at 708 to determine, for example, the importance of the data (e.g., how does the data negatively affect distribution of data across the network), underlying events (e.g., is the distribution of one event likely to invoke additional distribution of data that will further reduce system resources), and actions of the network users that are interested in a particular event (e.g., are recipients users more or less likely to respond to the distribution). The results of this analysis can be utilized by the computing resources, for example, to optimize the selection between the two solutions. The process then returns to 106 of FIG. 1 to complete the selection between the two solutions.

Figure 9:
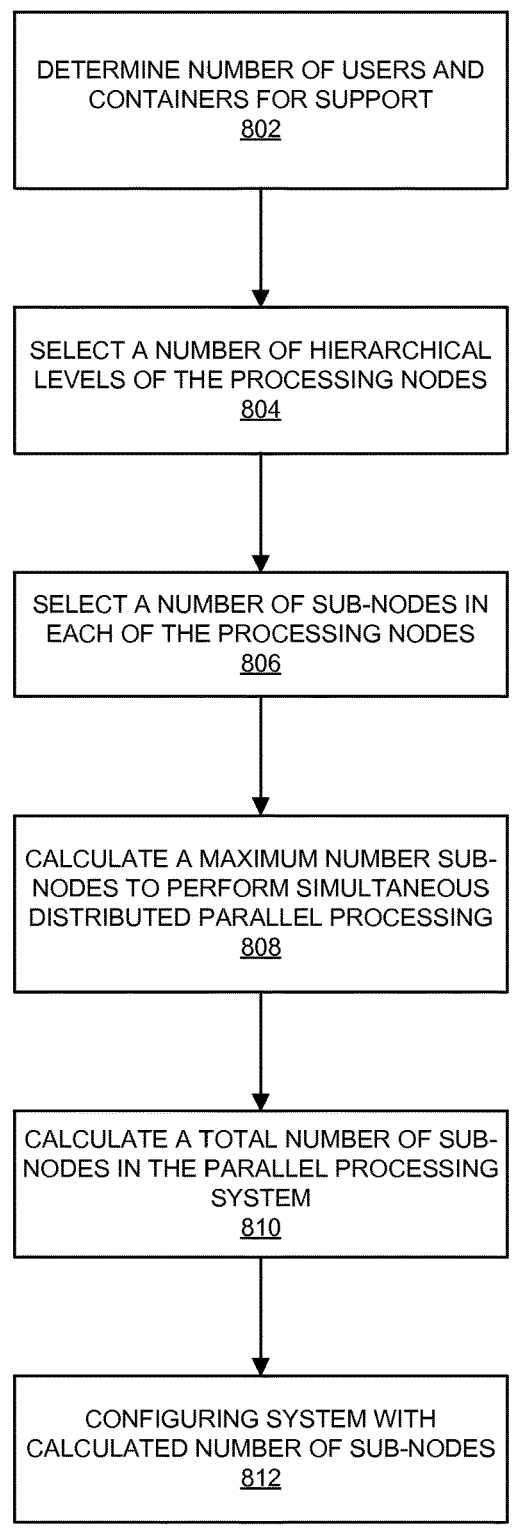
FIG. 9 depicts an exemplary flow chart of calculating a number of processing nodes to simultaneously perform distributed and parallel processing in accordance with FIGS. 7 and 8.

FIG. 7 depicts an exemplary table illustrating sample calculations for processing content simultaneously in distributed processing nodes. In particular, the calculations illustrate the maximum and total number of processing sub-nodes in respective processing nodes that may simultaneously process content being distributed in the social network when factoring the hierarchical level or "depth" (i.e., how many levels of processing nodes) and the processing sub-node count. The calculations may be advantageously used to increase distributed and parallel processing of data in the network (i.e., increase efficiency), while at the same time reducing or preventing the likelihood that any of the processing nodes/processing sub-nodes will be unable to process such data. In table 1600, the "depth" (D) is defined as the number of hierarchal levels (number of processing nodes at different levels), the "M" is defined as the maximum number of the combined sub-nodes performing simultaneous distributed parallel processing, the "R" is defined as the number of combined processing sub-nodes, and the "T" is defined as the total number of processing sub-nodes. In the table 1600 illustrated in FIG. 7, a first column with a header of "depth" (levels) ranges from a distributed and parallel processing system having a depth of zero (e.g., one hierarchal level) to a depth of five (e.g., six hierarchal levels). The columns following the "depth" column have headers that alternate between the maximum number of sub-nodes processing an event simultaneously (M) for a given number of processing sub-nodes (R) and the total number of processing sub-nodes (T) for a given number of processing sub-nodes (R), as explained in more detail below (FIG. 9). However, for a basic understanding of the table 1600, for a depth of zero (Depth=0) the maximum number of processing sub-nodes (M) having a processing sub-node count of three (R=3) is "1" and the total number of processing sub-nodes (T) having a processing sub-node count of three (R=3) is "3." Similarly, for a depth of five (Depth=5) the maximum number of processing sub-nodes (M) having a processing sub-node count of eight (R=8) is "5269" and the total number of processing sub-nodes (T) having a processing sub-node count of eight (R=8) is "42152."

The calculations may be performed in advance of implementing the network system for distribution of data. Although it is appreciated that such calculations may also occur during implementation to provide a dynamic system in which the number of processing nodes and processing sub-nodes may be adjusted as there is an increased or decreased number of users and/or data in the network. The method and process of calculation is described in more detail with reference to FIG. 9 below. It is appreciated that the calculations depicted in the illustrated table are exemplary and non-limiting embodiments. Any number of depths and processing sub-nodes counts may be used for calculation purposes as readily understood.

Figure 8:
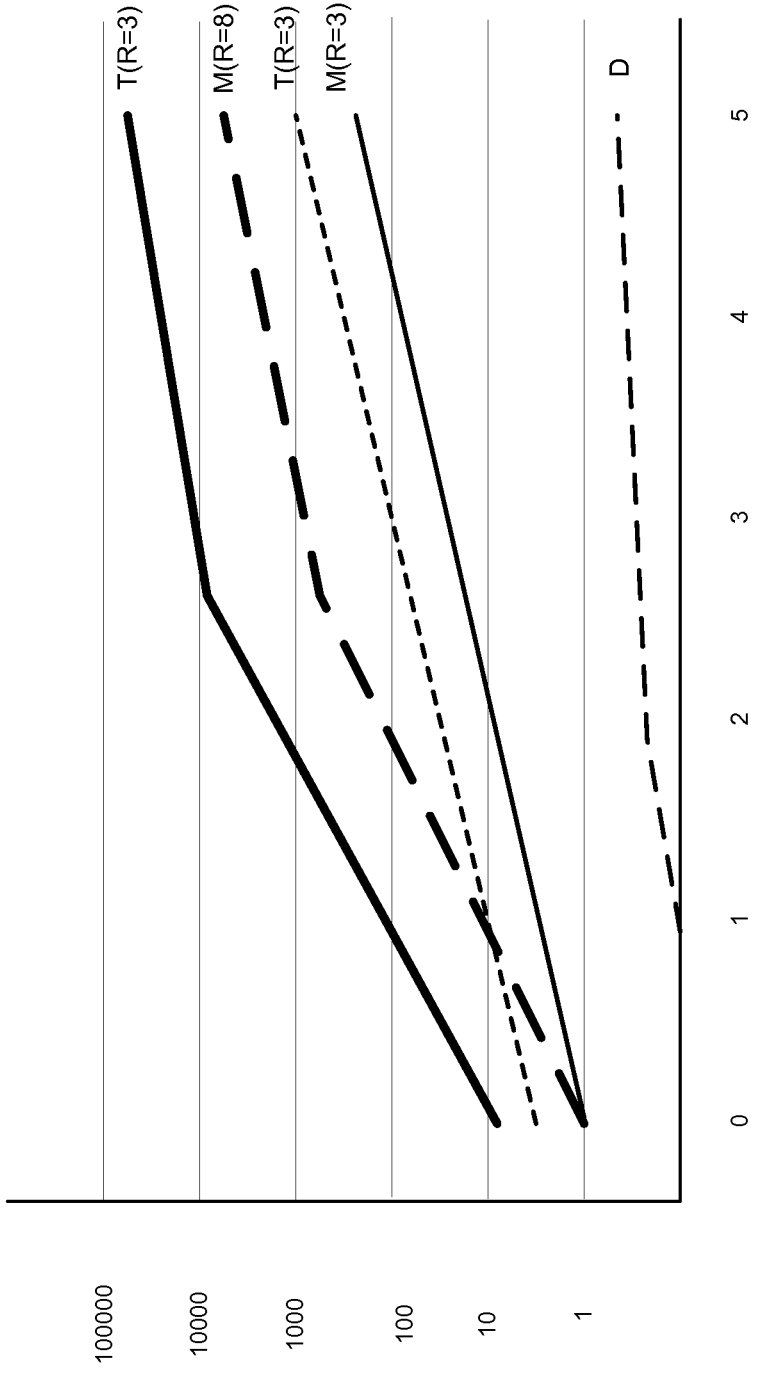
FIG. 8 depicts an exemplary chart illustrating the calculations depicted in the table of FIG. 7.

FIG. 8 depicts an exemplary chart illustrating the calculations depicted in the table of FIG. 7. The chart shows the maximum number of processing sub-nodes (M), hereinafter maximum sub-nodes M, processing events simultaneously and the total number of processing sub-nodes (T), hereinafter total sub-nodes T, in the system. The calculations of maximum sub-nodes M and total sub-nodes T are charted against the hierarchal level or "depth" D (i.e., number of processing nodes) on the horizontal axis versus the number of processing sub-nodes on the vertical axis. The depth is denoted on the chart by the dashed line D, which ranges from 0 to 5 levels. As depicted in the chart, as the number of hierarchal levels D (depth) increases, the maximum and total number of processing sub-nodes processing data in the system increases with sub-linear growth. For example, the chart illustrates the sub-linear growth of a maximum number of sub-nodes M for a depth D of three (the straight line denoted as M(R=3)) as ranging from (M=1 at D=0) to (M=364 at D=5), and the total number of sub-nodes T for a depth D of two (the dashed line denoted as T(R=3)) as ranging from (T=3 at D=0) to (T=1-92 at D=5). Similar sub-linear growth is illustrated on the chart with respect to the maximum sub-nodes M(R=8) and the total number of sub-nodes T(R=8).

FIG. 9 depicts an exemplary flow chart of calculating a number of nodes to simultaneously perform distributed and parallel processing in accordance with FIGS. 7 and 8. The process, including the equations, described below are used to calculate the maximum number of processing sub-nodes M and total number of processing sub-nodes T as illustrated in FIG. 7, and used to graph the depth D against the maximum number of processing sub-nodes M and the total number of processing sub-nodes T in FIG. 8.

At 802, a determination is made as to the number of users and corresponding containers the system will be required to support. Based on this determination, a calculation of the number of processing sub-nodes (including the maximum number and the total number) may be made to ensure that the system is capable of processing data with the number of resources currently in the system (or determining that additional resources will be required in the event that the numbers are not satisfied). This is accomplished by selecting a number of the hierarchical levels of the processing nodes at 804, and selecting a number of the processing sub-nodes in each of the processing nodes at 806. The maximum number of the processing sub-nodes to perform the simultaneous distributed parallel processing is then calculated at 808 according the equation:

$$M(D)=M(D-1)\times R+1.$$

It is noted that for a depth D of "0," the maximum number of processing sub-nodes is "1" (M(0)=1). At 810, a total number of processing sub-nodes in the parallel processing system is calculated according to the equation:

$$T(D)=M(D)\times R, \text{ where}$$

R is the number of the processing sub-nodes, D is the number of hierarchal levels of the processing nodes, M is the maximum number of the processing sub-nodes performing simultaneous distributed parallel processing, and T is the total number of the processing sub-nodes in the parallel processing system. At 812, the system (such as information distribution network system 214) is configured with the calculated processing sub-nodes 504.

In an exemplary calculation to determine the maximum number of processing sub-nodes M processing an event simultaneously (and the total number of sub-nodes), a depth D and processing sub-node count R is first selected. In the following example, a depth D is equal to two (2) and a processing sub-node count R of each processing node is equal to three (3). Thus, the equation M(2)=4×3+1 is calculated and results in M(2)=13. That is, the maximum number of processing sub-nodes M that may process data simultaneously for a depth D of two (2) and processing sub-node count of three (3) is thirteen (13). This is depicted, for example, in table 1600 with D=0 and R=3 (FIG. 7). Notably, the calculation uses a depth D that is dependent on the processing sub-node count of a previously calculated level (D−1). Thus, in the example above, the depth D of the previously calculated level is four (4), where D=1 and R=3, as depicted in table 1600 of FIG. 7. Similarly, to process the total number of processing sub-nodes T for a depth D of two (2) and a processing sub-node count of three (3), the equation T(2)=M(2)×R is calculated. The resulting calculation is T(2)=13×3, or T(2)=39. That is, the total number of processing sub-nodes T are in the system for a depth D of two (2) and a processing sub-node count of three (3) is thirty-nine (39). Calculation of the total number of processing sub-nodes T is also depicted in table 1600 of FIG. 7. It is appreciated that the described embodiments are merely exemplary, and that any number of calculations can be performed on the system to generate a depth table similar to the table in FIG. 7, as well as to generate the corresponding graph depicted in FIG. 8.

Figure 10:
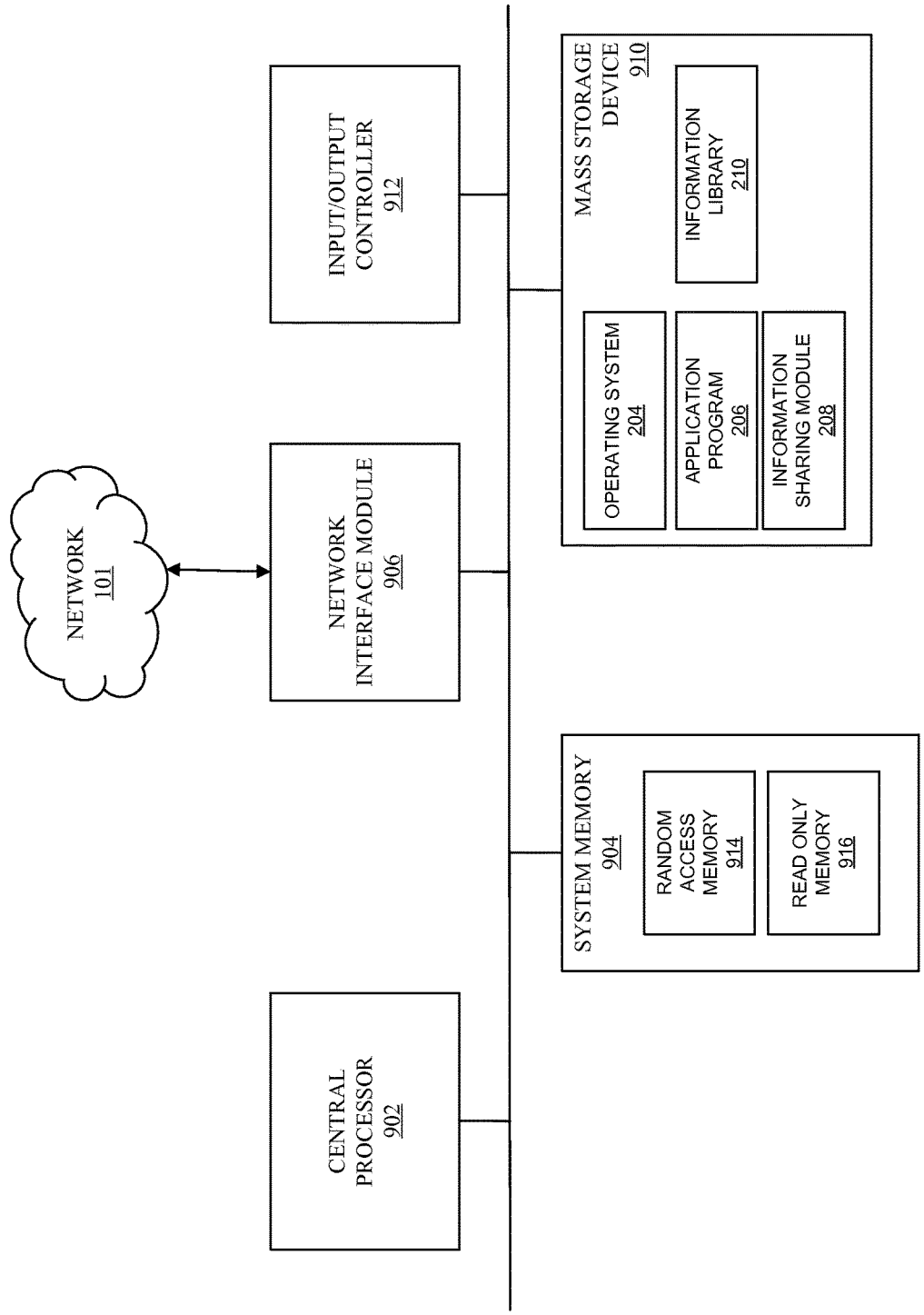
FIG. 10 depicts an exemplary general computer system that may be used to implement the systems in accordance with various embodiments.

FIG. 10 illustrates an exemplary general computer system that may be used to implement the systems in accordance with various embodiments illustrated in FIGS. 2 and 4. The computer system illustrates a conventional desktop, laptop, and/or server computer, and may be utilized to execute any aspects of the software components presented herein. The computer system includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer system, such as during startup, is stored in the ROM 916. The computer system further includes a mass storage device 910 for storing an operating system 204, application programs, and other program modules.

The mass storage device 910 is connected to the CPU 902 through a mass storage controller (not shown) connected to the bus 904. The mass storage device 910 and its associated computer-readable media provide non-volatile storage for the computer system. Although the description of computer-readable media contained herein refers to a mass storage device, such as a hard disk or CD-ROM drive, it should be appreciated by those skilled in the art that computer-readable media can be any available computer storage media that can be accessed by the computer system.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer system.

According to various embodiments, the computer system may operate in a networked environment using logical connections to remote computers through a network such as the network 101. The computer system may connect to the network 101 through a network interface unit 906 connected to the bus 904. It should be appreciated that the network interface unit 906 also may be utilized to connect to other types of networks and remote computer systems. The computer system also may include an input/output controller 912 for receiving and processing input from a number of other devices, including a keyboard, mouse, or electronic stylus (not shown). Similarly, an input/output controller may provide output to a display screen, a printer, or other type of output device (not shown).

As mentioned briefly above, a number of program modules and data files may be stored in the mass storage device 910 and RAM 914 of the computer architecture 500, including an operating system 204 suitable for controlling the operation of a networked desktop, laptop, or server computer. The mass storage device 910 and RAM 914 also may store one or more program modules. In particular, the mass storage device 910 and the RAM 914 may store the sharing module 208 and the application program 206. The mass storage device 910 and the RAM 914 also may store other types of program modules and data.

It should be appreciated that the software components described herein may, when loaded into the CPU 902 and executed, transform the CPU 902 and the overall computer system from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer system in order to store and execute the software components presented herein. It also should be appreciated that the computer system may include other types of computing devices, including hand-held computers, embedded computer systems, personal digital assistants, and other types of computing devices known to those skilled in the art. It is also contemplated that the computer system may not include all of the components shown in FIG. 10, may include other components that are not explicitly shown in FIG. 10, or may utilize an architecture completely different than that shown in FIG. 10.

Exemplary Embodiments

In one embodiment, the technology includes a method of distributing content from a source to a plurality of destination storage containers, including receiving the content at a first processing node in response to a distribution request by a first user, the first processing node comprising a finite number of a plurality of first sub-nodes, each of the first sub-nodes having a first sub-node pointer to a respective other of the first sub-nodes and comprising one or more first containers configured to store the content; distributing the content to one of the one or more first containers upon determining that the one of the one or more first containers of the first sub-node is a destination container; forwarding the content to the respective other of the first sub-nodes based on the first sub-node pointer; and responsive to identification of a connection pointer to a second processing node, distributing the content to the second processing node, the second processing node comprising a finite number of a plurality of second sub-nodes, each of the second sub-nodes having a second sub-node pointer to a respective other of the second sub-nodes and comprising one or more second containers to store the content being distributed.

In another embodiment, the technology includes any of the aforementioned embodiments wherein the method further includes prior to said distributing the content, determining a number of connections of the first user for distributing the content; comparing the number of connections to a threshold number; and when the number of connections is less than the threshold number, identifying a distribution list including the one or more first and second containers determined to be a destination container, and distributing the content from the source directly to the one or more first and second containers identified in the distribution list; and when the number of connections is greater than or equal to the threshold number, performing the receiving of the content at the first processing node, the distributing of the content to one of the one or more containers, the forwarding of the content to the respective other of the first sub-nodes, and the distributing of the content to the second processing node.

In another embodiment, the technology includes any of the aforementioned embodiments wherein the determining further includes identifying one or more second users having a connection with the first user and online with a network including the source and the one or more first containers, a number of total users currently online with the network, and an amount of different content being distributed over a specific path of the network.

In another embodiment, the technology includes any of the aforementioned embodiments wherein the connection pointer from the first processing sub-node to the second processing node is a bi-directional pointer that points to one of the first sub-nodes in the first processing node and to one of the second sub-nodes in the second processing node.

In another embodiment, the technology includes any of the aforementioned embodiments wherein the method further includes distributing the content to the one or more first containers in another of the respective first sub-nodes upon determining that the one or more first containers is a destination container; and forwarding the content to the respective another of the first sub-nodes based on the first sub-node pointer.

In another embodiment, the technology includes any of the aforementioned embodiments wherein the method further includes responsive to a request for the content distributed by the first user, accessing one of the one or more first and second containers associated with a second user and transmitting the content for display on a device of the second user.

In another embodiment, the technology includes any of the aforementioned embodiments wherein the first and second sub-nodes are determined by calculating a number of the first and second sub-nodes in the first and second processing nodes, the calculating including selecting a number of hierarchical levels of the first and second processing nodes and a number of the first and second sub-nodes in each of the first and second processing nodes; and calculating a maximum number of first and second sub-nodes to perform the simultaneous distributed parallel processing according to the equation: $M(D)=M(D-1) \times R+1$; calculating a total number of first and second sub-nodes according to the equation: $T(D)=M(D) \times R$, wherein R is the number of the first and second sub-nodes, D is the number of hierarchal levels of the first and second processing nodes, M is the maximum number of the first and second sub-nodes performing simultaneous distributed parallel processing, and T is the total number of the first and second sub-nodes In another embodiment, the technology includes any of the aforementioned embodiments wherein the distributed content comprises social media in the form of an event related to the first user, and the number of connections of the first user is greater than or equal to the threshold number.

In one embodiment, the technology comprises an apparatus to distribute content from a source to a plurality of destination storage containers, including a first processing node configured to receive content in response to a distribution request by a first user, the first processing node comprising a finite number of a plurality of first processing sub-nodes, each of the first processing sub-nodes having a first unidirectional sub-node pointer to a respective other of the first sub-nodes and comprising one or more first containers configured to store the content, wherein one of the first sub-node in the first processing node is configured to distribute the content to one of the one or more first containers upon determining that the one of the one or more first containers of the first sub-node is a destination container, the one first sub-node in the first processing node is configured to forward the content to the respective other of the first sub-nodes based on the first sub-node pointer, and the one first sub-node in the first processing node configured to distribute the content to a second processing node in response to identifying a connection pointer to the second processing node; and responsive to identification of a connection pointer to a second processing node configured to receive the content distributed by the first sub-node, the one first sub-node distributing the content to the second processing node, the second processing node comprising a finite number of a plurality of second sub-nodes, each of the second sub-nodes having a unidirectional second sub-node pointer to a respective other of the second sub-nodes and comprising one or more second containers to store the content being distributed.

In another embodiment, prior to distributing the content, the one first sub-node configured to determine a number of connections of the first user for distributing the content; the one first sub-node configured to compare the number of connections to a threshold number; and when the number of connections is less than the threshold number, the one first sub-node configured to identify a distribution list including the one or more first and second containers determined to be a destination container, and the one first sub-node configured to distribute the content from the source directly to the one or more first and second containers identified in the distribution list; and when the number of connections is greater than or equal to the threshold number, performing the one first sub-node configured to perform the receiving of the content at the first processing node, the distribution of the content to one of the one or more containers, the forwarding of the content to the respective other of the first sub-nodes, and the distribution of the content to the second processing node.

In another embodiment, the one first sub-node is further configured to identify one or more second users having a connection with the first user and online with a network including the source and the one or more first containers, a number of total users currently online with the network, and an amount of different content being distributed over a specific path of the network.

In another embodiment, the connection pointer from the first processing sub-node to the second processing node is a bi-directional pointer that points to one of the first sub-nodes in the first processing node and to one of the second sub-nodes in the second processing node.

In another embodiment, the one first sub-node distributing the content to the one or more first containers in another of the respective first sub-nodes upon determining that the one or more first containers is a destination container, and the one first sub-node forwarding the content to the respective another of the first sub-nodes based on the first sub-node pointer.

In another embodiment, the one first sub-node connected to a device to display content for the second user in response to a request for the content distributed by the first user by accessing one of the one or more first and second containers associated with the second user and transmitting the content to the device for display.

In another embodiment, the number of processing nodes and sub-nodes are determined by the one first sub-node configured to calculate a number of the first and second sub-nodes in the first and second processing nodes to simultaneously perform distributed parallel processing, the calculation by the computer system including the one first sub-node configured to select a number of the hierarchical levels of the first and second processing nodes and a number of the first and second sub-nodes in each of the first and second processing nodes; and the one first sub-node to calculate a maximum number of first and second sub-nodes to perform the simultaneous distributed parallel processing according to the equation: $M(D)=M(D-1)\times R+1$; the one first sub-node configured to calculate a total number of first and second sub-nodes in the parallel processing system according to the equation: $T(D)=M(D)\times R$, wherein R is the number of the first and second sub-nodes, D is the number of hierarchal levels of the first and second processing nodes, M is the maximum number of the first and second sub-nodes performing simultaneous distributed parallel processing, and T is the total number of the first and second sub-nodes.

In another embodiment, the distributed content comprises social media in the form of an event related to the first user, and the number of connections of the first user is greater than or equal to the threshold number of connections.

In one embodiment, there is a method of selectively distributing content from a source to a plurality of containers, including prior to distributing the content, determining a number of connections of a first user for distributing the content; comparing the number of connections to a threshold number; when the number of connections is less than the threshold number, identifying a distribution list including one or more of the containers determined to be a destination container, and distributing the content from the source directly to the one or more containers identified in the distribution list; and when the number of connections is greater than or equal to the threshold number, receiving the content at a first processing node in response to the distribution request by the first user, the first processing node comprising a finite number of a plurality of first sub-nodes, each of the first sub-nodes having a first sub-node pointer to a respective other of the first sub-nodes and comprising one or more first containers configured to store the content; distributing the content to one of the one or more first containers upon determining that the one of the one or more first containers of the first sub-node is a destination container; forwarding the content to the respective other of the first sub-nodes based on the first sub-node pointer; and responsive to identification of a connection pointer to a second processing node, distributing the content to the second processing node, the second processing node comprising a finite number of a plurality of second sub-nodes, each of the second sub-nodes having a second sub-node pointer to a respective other of the second sub-nodes and comprising one or more second containers to store the content being distributed.

In another embodiment, the method further includes responsive to a request for the content distributed by the first user, accessing one of the one or more first and second containers associated with a second user and transmitting the content for display on a device of the second user.

In another embodiment, the method further includes distributing the content to the one or more first containers in another of the respective first sub-nodes upon determining that the one or more first containers is a destination container; and forwarding the content to the respective another of the first sub-nodes based on the first sub-node pointer.

In another embodiment, the first and second sub-nodes are determined by calculating a number of the first and second sub-nodes in the first and second processing nodes, the calculating including selecting a number of hierarchical levels of the first and second processing nodes and a number of the first and second sub-nodes in each of the first and second processing nodes; and calculating a maximum number of first and second sub-nodes to perform the simultaneous distributed parallel processing according to the equation: $M(D)=M(D-1)\times R+1$; calculating a total number of first and second sub-nodes according to the equation: $T(D)=M(D)\times R$, wherein R is the number of the first and second sub-nodes, D is the number of hierarchal levels of the first and second processing nodes, M is the maximum number of the first and second sub-nodes performing simultaneous distributed parallel processing, and T is the total number of the first and second sub-nodes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for distributing content data from a broadcast-source device in a social media network environment to computer memory of a plurality of networked client devices, the method comprising:
   computing a threshold number of recipients for recursive parallel distribution, wherein the threshold number is based on a number of online users of the social media network environment; and
   in response to a distribution request by a broadcast user wherein a requested number of recipients is above the threshold number:
      receiving the content data from a first ring of client devices at a specified client device of a second ring of client devices, each client device of the second ring having a unidirectional sub-node pointer to another client device of the second ring and having one or more second ring computer-memory containers,
      distributing the content data from the specified client device to one of the second ring computer-memory containers upon determining that the one of the second ring computer-memory containers is a destination container corresponding to one or more users following the broadcast user in the social media network environment,
      forwarding the content data from the specified client device to exactly one client device of the second ring based on the unidirectional sub-node pointer of the client conduit device, and storing the content data at the one or more second ring computer-memory containers identified as a destination container, wherein the content data is forwarded unidirectional and recursively to each of the client devices of the second ring via the unidirectional sub-node pointers of the client devices of the second ring, and
      responsive to identification of a bidirectional connection pointer to exactly one associated client device of a third ring of client devices, distributing the content data to the exactly one associated client device, each client device of the third ring having a unidirectional sub-node pointer to another client device of the third ring, and having one or more third ring computer-memory containers,
      wherein each client device of the second ring of client devices is connectable to a client device of another ring of client devices via a bidirectional connection pointer; and
   when the requested number of recipients is below the threshold number:

providing a distribution list including one or more destination containers, and receiving distribution of the content data from the broadcast-source device directly to the one or more destination containers.

2. The method of claim 1, wherein a maximum number M of combined client devices performing simultaneous distributed parallel processing at level D is given by M(D)=M(D−1)×R+1, and wherein a total number T of processing client devices at level D is given by T(D)=M(D)×R, where R is a number of combined client devices, and where level D includes one or more rings of client devices.

3. A computer memory holding instructions executable by a processor of a specified client device to distribute content data from a broadcast-source device to a plurality of networked client devices in a social media network environment, the instructions comprising:

instructions to compute a threshold number of recipients for recursive parallel distribution, wherein the threshold number is based on a number of online users of the social media network environment;

instructions to, in response to a distribution request by a broadcast user wherein a requested number of recipients is above the threshold number, receive the content data from a first ring of client devices at the specified client device, the specified client device being one of a second ring of client devices, each client device of the second ring having a unidirectional pointer to another of the second ring of client devices and having one or more second-ring computer-memory containers;

instructions to distribute the content data to one of the second-ring computer-memory containers upon determining that the one of the second-ring computer-memory containers is a destination container corresponding to one or more users following the broadcast user in the social media network environment, instructions to forward the content data from the specified client device to exactly one client device of the second ring based on the unidirectional pointer, and to store the content data at the one or more second-ring computer-memory containers identified as a destination container, wherein the content data is forwarded unidirectionally and recursively to each of the client devices of the second ring via the sub-node pointers of the client devices of the second ring;

instructions to, responsive to identification of a bidirectional connection pointer to exactly one associated client device of a third ring of client devices, distribute the content data to the exactly one associated client device, each of the third ring of client devices being arranged outside of the second ring of client devices, having a unidirectional pointer to another of the third ring of client devices, and having one or more third-ring computer-memory containers, wherein each client device of the second ring of client devices is connectable to a client device of another ring of client devices via a bidirectional connection pointer; and instructions to compare a number of connections of the broadcast user to the threshold number, and, when the number of connections is below the threshold number, to provide a distribution list including one or more destination containers and receive distribution of the content data from the broadcast-source device directly to the one or more destination containers.

4. The computer memory of claim 3, wherein a maximum number M of combined client devices performing simultaneous distributed parallel processing at level D is given by M(D)=M(D−1)×R+1, and wherein a total number T of processing client devices at level D is given by T(D)=M(D)×R, where R is a number of combined client devices, and where level D includes one or more rings of client devices.

* * * * *